United States Patent [19]

Shiina

[11] Patent Number: 4,750,875
[45] Date of Patent: Jun. 14, 1988

[54] INJECTION MOLDING MACHINE PROVIDING A ROTARY TYPE CLAMPING DEVICE

[75] Inventor: Toshio Shiina, Kasugai, Japan

[73] Assignee: Kabushiki Kaisha Meiki Seisakusho, Aichi, Japan

[21] Appl. No.: 7,242

[22] Filed: Jan. 27, 1987

[51] Int. Cl.[4] .............................................. B29C 45/16
[52] U.S. Cl. .................................. 425/130; 264/245; 264/246; 264/255; 264/328.8; 425/134
[58] Field of Search ........................ 425/130, 134, 47; 264/245, 246, 328.8, 255

[56] References Cited

U.S. PATENT DOCUMENTS 3,807,920  4/1974  Aoki .................................. 425/130
4,563,139  1/1986  Yokoyama ........................... 425/47

Primary Examiner—Jay H. Woo
Assistant Examiner—Timothy W. Heitbrink
Attorney, Agent, or Firm—Browdy and Neimark

[57] ABSTRACT

An injection molding machine having a movable platen movable between two stationary platens which are fixed respectively to both ends of the tie rods, a rotary table platen provided with said movable platen, an angular indexing device rotating said rotary table platen and indexing angular of rotation of said rotary table platen, a resilient coupling provided in midway of shaft connecting said angular indexing and rotary table platen, a table supporting device supporting said rotary table platen against mold opening force.

5 Claims, 2 Drawing Sheets

INJECTION MOLDING MACHINE PROVIDING A ROTARY TYPE CLAMPING DEVICE

BACKGROUND OF THE INVENTION

1. Field of the Invention

This invention relates to an improved injection molding machine providing a rotary type clamping apparatus for molding of multicolor or multilayer products and more particularly an improved rotation mechanism of rotary table plate on which plural moldhalves are fixed.

2. Refferrence to Prior Art

A rotary injection molding machine provides a clamping apparatus of which plural molds are fixed on the rotary table plate for multicolor or multilayer molding and insert molding with the rotary type clamping apparatus of an injection molding machine; the stationary moldhalves with a stationary platen and movable moldhalves with a movable platen are provided and a rotary table plate is provided with either of them.

For molding of multilayer or multicolor products, the following operation is required of the rotary type clamping apparatus, that is, the movable platen is reciprocated to the stationary platen for mold opening and closing, and after moldhalves have been closed, the movable platen is pressed to the stationary platen for clamping the moldhalves. And moreover, rotation of the rotary table plate providing plural male mold halves is required for multi injection molding. For this requirement it is required for the rotary table plate to touch the movable platen closely while clamping the moldhalves and to be apart from the movable platen while rotating. For supplying such requirement, a spline shaft is used to rotate the rotary table plate. But backlash of the spline shaft makes error of stop position of the moldhalves; the larger the radius of the rotary table plate is, the larger the error is.

And also when the rotary table plate rotates, it is required that the rotary table plate is lifted from the movable platen to prevent friction between the rotary table plate and the movable platen and consequently a lifting device of the rotary table plate is needed.

SUMMARY OF INVENTION

It is an object of the present invention to provide an improved clamping apparatus of an injection molding machine providing a rotary table plate to rotate plural moldhalves for manufacturing multicolor or multilayer products.

It is another object of the present invention to provide the functions that permit displacement in the axial direction of the rotary shaft which makes the rotary table plate to rotate without sacrifice of indexing accuracy such as spline shaft while mold closing. This object is achieved by providing the rotary shaft with the resilient coupling between an angular indexing apparatus and the rotary table plate.

It is further object of the present invention to prevent displacement of the periphery portion of the rotary table plate due to bending force while mold opening. This object is achieved by providing a table supporting device.

DESCRIPTION OF THE PREFERRED EMBODIMENT

Figure 1:
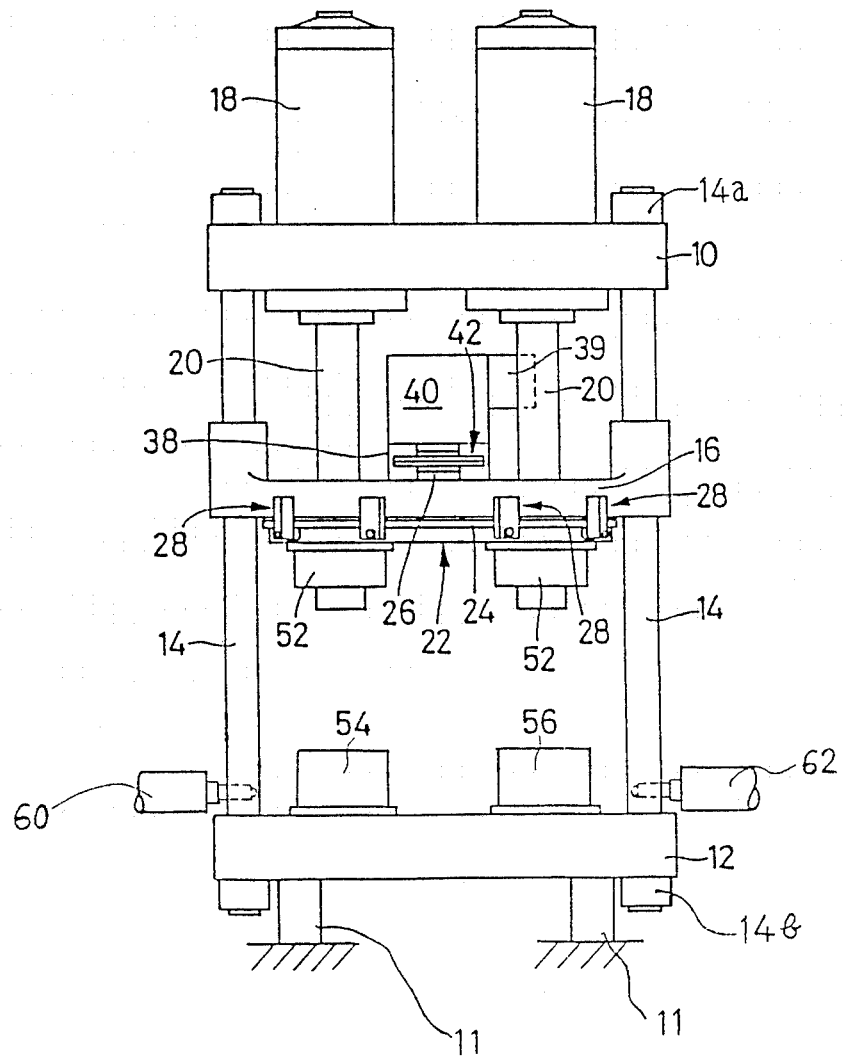
FIG. 1 shows a elevation of the embodiment of the invention.

Referring to FIG. 1, there is shown a vertical type clamping apparatus of an infection molding machine which provides a rotary table plate 22 having indexing function. A lower platen 12 is fixed on the ground through base plate 11 and upper platen 10 is fixed by the nuts 14a to the upper end of four tie rods 14 of which the lower end is fixed by the nuts 14b to the lower platen 12.

A movable platen 16 is fixed to the end of a piston rod 20 of which the piston is inserted into hydraulic cylinder 18, and is reciprocably guided by the four tie rods 14.

Figure 2:
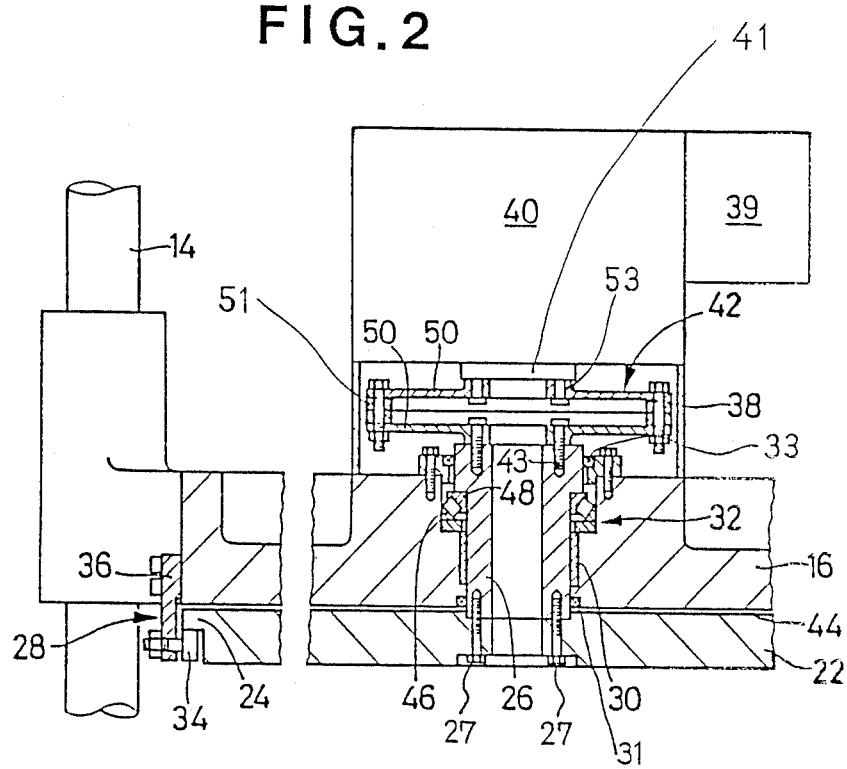
FIG. 2 shows a part elevation partly in section in FIG. 1.

Referring to FIG. 2, an end portion of a hollow rotary shaft 26 is fixed to the center or the rotary table platen 22 by the bolts 27 and the hollow rotary shaft 26 rotatably supported, through the hole of the center portion of the movable platen 16, and the other end of the hollow rotary shaft 26 is connected to the coupling 42 by the bolts 43.

The coupling 42 is connected to a driving shaft 41 of the indexing apparatus 40 to be driven by the motor 39. The indexing apparatus 40 of the rotary table plate 22 is fixedly mounted on the movable platen 16 by the housing bracket 38.

A cylindical bearing 30, which is made of sintered alloy, is provided in the hole of the center portion of the movable platen 16 to keep precisely the center of the hollow rotary shaft 26 to the center portion of the movable platen 16 and to facilitate movement of the hollow rotary shaft 26 upwards or downwards. A spherical roller thrust bearing 32 is provided between the hollow rotary shaft 26 and the hole of the center portion of movable platen 16 to support the downward load of the hollow rotary shaft 26 while rotating the rotary table platen 22. An outer race 46 of the spherical roller thrust bearing 32 is fixed in the hole of the center portion of the movable platen 16 and an inner race 48 is fixed on the hollow rotary shaft 26. Oil seals 31 and 33 are provided to prevent leakage of oil.

The coupling 42 consists of two steel disc plates 50 having a boss 53 and a distance spacer ring 51. The coupling 42 has the functions that permits displacement in the axial direction of the hollow rotary shaft 26 and relieves the rotational force of inertia of the rotary table plate 22 due to torsional elasticity of the boss 53.

A table supporting device 28 consists of plural brackets 36 the upper ends of which are fixed on the side of the movable platen 16, and plural rollers 34 which are rotatably supported by the bottom ends of the brackets 36.

ILLUSTRATION OF OPERATION

In the embodiment of operation of this invention, two colored injection moldings such as the keytop of a typewriter are illustratively made.

After the moldhalves have been closed by downward movement of the piston rods 20, melted material of a first color is injected into a cavity of a first female moldhalf 54 from the injection cylinder 60.

When the moldhalves are closed to be pressed, the rotary table plate 22 on which the moldhalves are fixedly mounted is inevitably axially, i.e. vertically displaced toward the movable platen 16.

Figure 3:
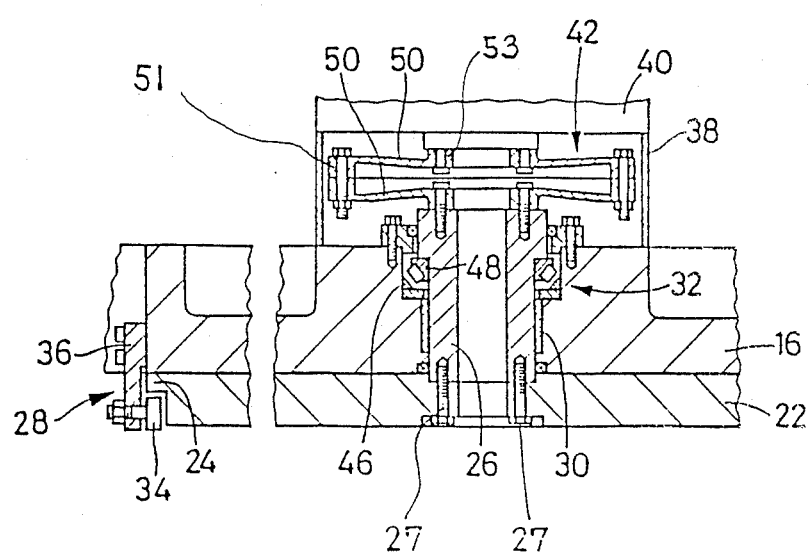
FIG. 3 shows a elevation of other status in operation of FIG. 2.

Consequently the two steel discplates 50 of the coupling 42 is transfomed resiliently due to displacemnet of the hollow rotary shaft 26 in the axial direction as shown in FIG. 3. As another embodiment, the two steel discplates 50 of the coupling 42 can be replaced by material such as rubber or urethane etc.

When the moldhalves are opened by upperward movement of the movable platen 16 after cooling of the first colored material in the cavity has been finished, the opening force of the mold against adhesive force of the products adhered to the surface of the cavity of the mold acts upon the rotary table platen. This opening force acts upon the brackets 36 through the flange 24 of the outer periphery of the rotary table platen 22.

After fully opening of mold, the gap 44 (see FIG. 2) between under surface of the movable platen 16 and upper surface of the rotary table platen 16 occures compulsorily due to resilience of the coupling 42. The rotary table plate 22 is then rotated on the rollers of the table supporting device 28 through 180° by the angular indexing apparatus 39.

A male moldhalf 52 on which a colored product is adhered, is positioned just above a second female moldhalf 56 having larger inside diameter than that of the first female moldhalf 54, and is closed into the female moldhalf 56.

Melted material of other color is injected into the cavity of the moldhalf 56.

After mold opens, final colored products is taken off the moldhalf 52 by ejecting operation.

What is claimed is:

1. An injection molding machine comprising:
   a first stationary platen carrying a plurality of first moldhalves, said first platen being fixed on a base plate,
   a plurality of tie rods having end portions fixed to said stationary platen,
   a second stationary platen fixed to other end portions of said tie rods,
   a movable platen carrying a rotary table plate in turn carrying a plurality of second moldhalves, said movable platen being slidable between said two stationary platens along said tie rods,
   at least one hydraulic cylinder for reciprocating said movable platen toward and away from said stationary platen for clamping or opening of the moldhalves,
   an indexing means for rotational indexing of said rotary table, said indexing means comprising a driving shaft for rotatably driving said rotary table relative to said movable platen,
   a rotary shaft having a longitudinal axis rotatably supporting said rotary table on said movable platen,
   an axially resilient coupling resiliently connecting said driving shaft to said rotary shaft, and
   a plurality of injection cylinders for injecting different materials for molding a multi-layered or multi colored article.

2. An injection molding machine as defined in claim 1 wherein said resilient coupling comprises means permitting displacement in the direction of the longitudinal axis of said rotary shaft without backlash between said driving shaft and said rotary shaft.

3. An injection molding machine as defined in claim 1 wherein said rotary table is supported at its periphery against opening force of the moldhalves by a supporting device which comprises plural brackets of which an upper end of each is fixed on the side of the movable platen and plural rollers which are rotatably supported at the bottom end of each said bracket.

4. An injection molding machine according to claim 1 wherein said rotary shaft is hollow with an upper end thereof fixed to said axially resilient coupling and a lower end thereof fixed to said rotary table.

5. An injection molding machine according to claim 2 wherein said resilient coupling comprises a pair of disc plates spaced apart from one another and connected together along their peripheries.

* * * * *